(No Model.)

A. S. BENNER.
MILK COOLER.

No. 261,823. Patented Aug. 1, 1882.

Attests
Wesley Williams.

Inventor
Abraham S. Benner
By his atty.

UNITED STATES PATENT OFFICE.

ABRAHAM S. BENNER, OF PERKASIE, PENNSYLVANIA.

MILK-COOLER.

SPECIFICATION forming part of Letters Patent No. 261,823, dated August 1, 1882.

Application filed March 30, 1882. (No model.)

*To all whom it may concern:*

Be it known that I, ABRAHAM S. BENNER, of the city of Perkasie, in the county of Bucks and State of Pennsylvania, have invented an Improvement in Milk-Coolers, of which the following is a specification.

My invention has reference to coolers in general, but more particularly to milk-coolers; and it consists in the peculiar construction of the ice or cold-water vat and its arrangement with the milk vat or tank, and in details, all of which are fully set forth in the following specification, and shown in the accompanying drawings, which form part thereof.

The object of my invention is to provide a cooling-vat to a milk or other cooler, which shall furnish a cooling medium throughout the interior body of the liquid to be cooled, and shall keep a cooling-surface of water above the same; also, to so arrange the supply-pipes and discharge-pipes that the cold water is first supplied to the upper or cooling surface, and then finds its way down the cooling center of the vat and escapes up the vent, which is formed on the side of said vat.

Figure 1:
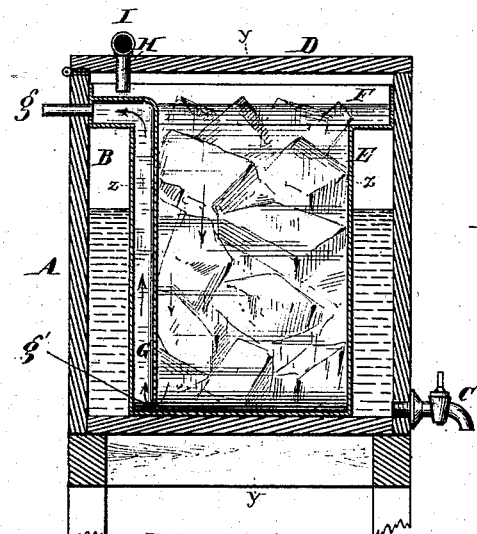
Figure 2:
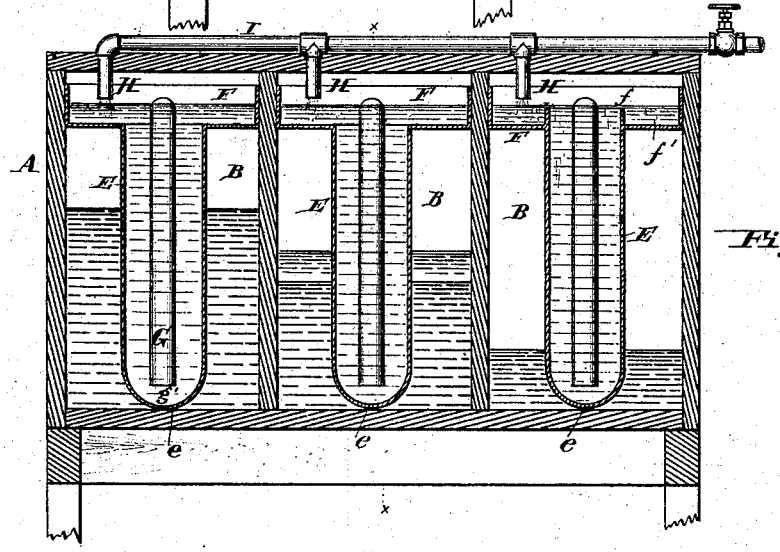
Figure 3:
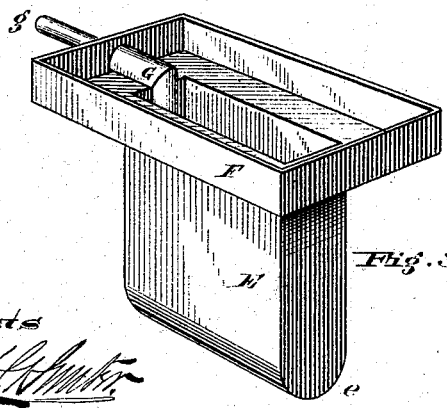
Figure 4:

In the drawings, Figure 1 is a sectional elevation of my improved cooler on line $xx$. Fig. 2 is a sectional elevation of same on line $yy$. Fig. 3 is a perspective view of my cold-water or ice vat, and Fig. 4 is a cross-section of same.

A is the body of the tank, and may be divided into one or more compartments, B B B, three being preferred in practice, as from one the cream is being used, the second is raising cream, and the third contains the fresh milk. The bottoms of these compartments B are provided with cocks C, by which to draw off the contents, and their fronts may be provided with a cream-glass, as is common in milk-coolers.

D is a cover, and is hinged to the body of the tank A, or may be separate from it. The cold-water or ice vats E are of general rectangular shape in cross-section, and set in the compartments B. Their bottoms $e$ are rounded, as shown, and rest upon the bottom of the tank A, thereby touching only on a line, and practically allowing the milk to circulate under the said vat E. The top of this vat E is provided with a tray or flanged pan, F, opening in the center into the vat E, and which pan has its vertical sides made to fit against the sides of the compartment B, and thereby inclose all of the said compartment below said pan.

Formed upon one side of the vat E and pan F is the vent or discharge G, which opens into the bottom of vat E at $g'$, and is provided at the top, and projecting from the side of the pan F, with a tube $g$, which passes through a hole in the tank A.

Passing through the lid or cover D, and arranged to discharge into the pan or vat, are the supply-pipes H, which are connected to a water-main, I. The water-main I or pipes H, or both, may be provided with suitable cocks. The discharge $g$ being above the bottom of the pan F, the bottom of said pan will always be covered with cold water, and, if desired, the sides of the vat E may be extended up, as at $f$, so as to form an annular tray, $f'$; but this is not necessary. If desired, the vats E and trays or pans F may be used for water or ice, or both combined.

The tank A being filled with milk, and the supply of water being turned on, the cold water runs into the pans F, and after passing down through the vats E it runs up through the vents G and discharges from the pipes $g$. The vats and pans may be filled with ice alone, if desired, when used in private families or for domestic purposes; or cold water may be run through, as above, when they contain ice, and by using a pump the same cold water may be used over and over. This is particularly so when there is only enough ice to fill the bottoms of vats E, as then the cold ice-water is drawn off and poured into the pan F, keeping up a great cooling effect. The vat E and its tray F are easily removable from the tank A by simply lifting on the front end and then drawing out.

I am aware of the patents granted to Hawkins July 15, 1873, McDonald April 8, 1873, and Hayward September 7, 1880, and claim nothing therein shown or claimed.

Having now described my invention, what I claim as new, and desire to secure by Letters Patent, is—

1. A milk-tank provided with a cold-water or ice vat resting on the bottom and occupying its middle part, said vat being provided on the top with a tray or pan which opens into it, and which closes the top of the chamber or tank in which said vat sets, the said tray supporting the vat in an upright position by fitting within the tank, the orifice of which it closes, substantially as and for the purpose specified.

2. A milk tank or chamber provided with a cold-water or ice vat resting on the bottom and occupying the middle part thereof, said vat being provided on the top with a tray or pan which opens into it, and which closes the top of the chamber or tank in which said vat rests, in combination with means to feed cold water to said pan and discharge it from the bottom of said vat, the said tray supporting the vat in an upright position by fitting within the tank, the orifice of which it closes, substantially as and for the purpose specified.

3. In a cooler, the combination of tank A, provided with compartments B, having cocks C, cover or lid D, having supply-pipes H, vat E, having tray or pan F, and discharge-vent G, as shown and described.

4. In a cooler, the chamber B, in combination with vat E, similar in shape, but of less section-area in cross-section, rounded on the bottom, as at $e$, and provided at the top with a pan or tray, F, having the inner flange, $f$, and fitting within the top of said chamber to close in the milk with a water-lid, as shown and described.

In testimony of which invention I hereunto set my hand.

ABRAHAM S. BENNER.

Witnesses:
R. M. HUNTER,
R. S. CHILD, Jr.